United States Patent [19]

Manser et al.

[11] Patent Number: 4,830,866
[45] Date of Patent: May 16, 1989

[54] PROCESS FOR MANUFACTURING FARINACEOUS PRODUCTS

[75] Inventors: Josef Manser, Uzwil; Werner Seiler, Züberwangen; Friedrich Egger, Niederuzwil, all of Switzerland

[73] Assignee: Gebruder Buhler AG, Switzerland

[21] Appl. No.: 902,454

[22] PCT Filed: Dec. 24, 1985

[86] PCT No.: PCT/EP85/00739
§ 371 Date: Aug. 25, 1986
§ 102(e) Date: Aug. 25, 1986

[87] PCT Pub. No.: WO86/03654
PCT Pub. Date: Jul. 3, 1986

[30] Foreign Application Priority Data

Dec. 24, 1984 [DE] Fed. Rep. of Germany ....... 3447308

[51] Int. Cl.⁴ .................................................. A23L 1/16
[52] U.S. Cl. ...................................... 426/451; 426/496; 426/511; 426/557
[58] Field of Search ............... 426/451, 496, 510, 511, 426/557

[56] References Cited

U.S. PATENT DOCUMENTS

| | | | |
|---|---|---|---|
| 3,172,765 | 3/1965 | Cavloni | 426/451 |
| 3,537,862 | 11/1970 | Peters et al. | 426/451 |
| 4,539,214 | 9/1985 | Winter et al. | 426/451 |

*Primary Examiner*—George Yeung
*Attorney, Agent, or Firm*—Darby & Darby

[57] ABSTRACT

A process is described for manufacturing of farinaceous products in which the soft farinaceous product leaving a molding head is conveyed through differentially heated climatic zone and is cooled and/or dimensionally stabilized after completion of the drying process. The farinaceous product is heated to a temperature of 80° to 100° C. with at least slight initial drying and freshly expanded superheated steam is then allowed to flow around it for about 30 seconds to 20 minutes. In this process the native starch of the boundary layer of the farinaceous product is converted into swelling starch. Finally the farinaceous product is dried in a controlled drying climate.

9 Claims, 9 Drawing Sheets

FIG. 2
PRODUCT TEMPERATURE

PROCESS FOR MANUFACTURING FARINACEOUS PRODUCTS

FIELD OF THE INVENTION

The invention relates to a process for manufacturing classical farinaceous products having a final moisture content of about 11 to 14% by weight, the farinaceous product, which leaves a molding haad in the form of a soft material which is moist and moldable, is conveyed through differentially heated climatic zones up to the final drying and the farinaceous product is cooled and/or dimensionally stabilized in a further climatic zone after completion of the drying process.

BACKGROUND OF THE INVENTION

Cereal becomes a readily acceptable foodstuff for human beings only after digestion of the starch by heat. The naturally occurring cereal is a "living material structure" just as, however, this is also true of untreated flour and semolina. They are subject to changes through their internal metabolism, becoming depleted in particular in certain components. This process is intensified by the action of heat and light, contact with atmospheric oxygen, moisture, and also through multiplication of degradative microorganisms and other pests. Preservation of foodstuffs having a starch component implies both that tee changes proceeding within them, due primarily to their natural enzymes, are stopped, and also that hhe micro-organisms are killed or their development is impeded. Various processes are available for preservation. These processes should be capable of implementation in a manner wiich is as technically simple and economic as possible. In particular, these processes are also subject to the requirement that the accustomed taste values of the foodstuffs which result are retained as far as possible, and no reduction of the nutritional value or unbeneficial change in the proteins occurs.

In addition to bread, farinaceous products, in particular long farinaceous products and short products, are today particularly widespread basic foodstuffs which are also used to a fairly large extent as reserves.

In general, by farinaceous products are meant ready-to-cook products with good storage capability made from starch-rich, protein-containing ground grain products which are manufactured by shaping and careful drying without the dough mixture being subjected to a fermentation or baking process. Depending on the nature of the raw materials, optionally containing additions of egg, common salt, milk, casein, dry gluten, seasoning or coloring materials etc., a distinction is made between, for example, pasta all'novo (egg-containing) products and egg-free farinaceous products and also semolina and flour farinaceous products.

Excluded from the types of product to be improved by the invention described below are all other grain foodstuffs such as spaetzle, snack-like and bread-like products which pass through the dough stage in their manufacture, but are not usually described as farinaceous products.

The present market offer in relation to true farinaceous products essentially comprises by three basic types of farinaceous products, namely the traditionally dried short or long products, the instant farinaceous products in dried form (ready meals, fast food) and also the preserved farinaceous products (undried). Both in the case of the instant farinaceous products and in the case of the preserved farinaceous products the market share is relatively small because of the perceptibly higher manufacturing and selling price and of the quality which as a rule cannot be achieved in comparison with the traditional farinaceous products. In addition to this, in the case of instant farinaceous products, which only have to have hot or warm water poured over them, there is no actual cooking time and cooking temperature of 100° C., which involves a source of risk.

In the case of the so-called classical farinaceous products final shaping is characteristically by means of a mold. In the case of the short products the farinaceous products are cut to the desired length immediately after their emergence from the mold. Examples of this are the short-cut macaroni and macaroni. However, there are also a number of special shapes, for example whirls and nidi (nests), which immediately after emerging from the mold are given the permanent shape by a suitable guide mechanism. This additional shape is lost again by the farinaceous product on cooking. This means that it is then only a matter of conventional spaghetti or noodles. Spaghetti and cannelloni are usually cut to the final length only after drying. The classical farinaceous product is characterized in that it is cooked at the consumer's premises in water for about 10 to 20 minutes on average and has to be processed with additives to form a finished meal. Hereafter this classical farinaceous product is described as "farinaceous product".

The main raw materials of the farinaceous products are durum semolina and durum fine middlings which are expected to have a constant grain-sized distribution, a high protein and yellow pigments content, and also a good pigment stability with little tendency to greyish brown discoloration.

In the dough preparation about 18 to 25% by weight of water are added to the cereal raw materials. The freshly formed farinaceous product contains on average about 30 to 32% moisture, and the finally dried and packed product only about 10 to 14% by weight, in particular about 12.5% by weight.

In the shaping or molding of the starting material for the farinaceous product basically two procedures may be adopted:

(a) the older batch process involving the preparation of a homogeneous, moldable dough in pre-kneading machine and kneading machine (gramola) and molding in hydraulic presses, or (b) the modern continuous process involving so-called worm presses in which a homogeneous dough is not kneaded in the first section, but only a crumbly dough mass is initially formed in troughs using mixing paddle mechanisms, which mixture is then slowly conveyed by the conveyor worms and fed to the molding head.

The necessary homogeneous kneading or "gluing" of the dough is first effected by the shearing forces in the expressing worm and also the high pressures of about 80 to 120 bar which prevail in the molding chamber and during the passage of the dough through hhe die itself. The homogenized, kneaded, moist and moldable dough is pressed out of the die in the form of a continuous stream of finally shaped dough strands considerably compressed in structure. A fan immediately dries the emerging dough strands superficially in order to remove their stickiness.

Directly below the die rotating knives may be disposed with which the preformed strands are cut to the desired length. It is then necessary to dry the strands so obtained to produce a nonperishable product, drying taking place from the outside inward. In this process it is important that the surface does not harden excessively rapidly before the core in order to prevent splits and cracks in the finished farinaceous product. In general about 1–2% by weight of water is lost through the superficial drying of the farinaceous product after emergence from the molding head.

In practice drying is at present carried out for long products for 8 to 12 hours at a temperature of 70° to 75° C. In known methods for manufacturing the traditional farinaceous products a level has been achieved which it was not possible to raise further in relation to the economic implementation of the process without qualitative losses in the product quality. In more recent times, in particular, reservations have been voiced, not least in consumer circles, in various respects such as gummi dente (well done), instead of al dente farinaceous products, and also questions on the nutritional value and on the undesirable enzymatic reactions etc.

In the Swiss Pat. No. 383,747 a process is described for treating farinaceous products in which the farinaceous products are heated in a zone to 40° to 100° C. or 60° to 80° C. and are then treated with superheated steam at preferably 101° to 170° C. for 5 to 30 seconds. This is followed by drying to produce the final product. This known process is said to eliminate various disadvantages of other processes which were encountered earlier, in particular undesirable enzymatic reactions are said to be prevented. No artificial coloring substances are said to be necessary and shorter drying times are said to be achievable. The farinaceous product acquires a smooth shiny and transparent appearance throug the treatment with superheated steam. Experiments with the recommended values confirm that the results quoted can in fact be achieved and that the use of superheated steam has a beneficial effect on the qualitative features, with the exception, however, of the desirable appearance of the farinaceous product. If a good farinaceous product as desired by the consumer is broken, a smooth, shiny and inwardly transparent structure is perceived at the break. The other surfaces appear matt. Cheap products, the so-called pasta secco (or water-based) products, have a predominantly whitish and matt surface. Pasta all'novo (egg-containing) products have a slightly yellowish to golden yellow tint, but also the glassiness at the breaking point described above. The consumer rates a matt, egg-colored appearance of the farinaceous product as good.

In contrast to this, the product treated with superheated steam acquires an unnatural, almost plastic-like appearance. A consumer views such a product with deep mistrust and regularly refuses to buy it, which does not depend on whether said product has possibly been improved in relation to the substances it contains (lysin and the like).

SUMMARY OF THE INVENTION

The invention is based on the object of developing the process described in the introduction so that it becomes possible, in particular, to increase the economic efficiency of the apparatus used for the purpose while maintaining the traditional product quality, in order to satisfy even the increased requirements of the connoisseur with the qualitatively best farinaceous products for the consumer.

According to the invention this object is achieved in that the farinaceous product leaving the molding head is heated in a first climatic zone to a temperature of 80° to 100° C. with at least slight initial drying, freshly expanded superheated steam, which converts the native starch of the boundary layer of the farinaceous product into swelling starch, is then allowed to flow round it for about 30 seconds to 20 minutes, and the farinaceous product is then dried in a controlled drying climate to the final moisture content.

For the understanding of the present invention it is important that four states are distinguished for starch grains, namely that of native starch, that of swelling starch, that of a glutinated starch and that of starch without double refraction.

Starch is described then as native starch if it remains constituted as the plant body formed it. Starch grains have a particular size for the same type of plant. The starch grain, whose shape can easily be recognized under the microscope is enveloped by a cell membrane and has a crystalline structure in the interior. The cell membrane and crystalline structure prevent the starch grain absorbing large quantities of water. Starch in the native state is not water soluble. In a freshly made dough almost the entire quantity of water is accumulated at the starch grain and is primarily absorbed by the protein. Native starch tends to be difficult for humans to digest. In the uncooked state the traditional farinaceous products contain only native starch in addition to protein, the starch in the common raw materials for farinaceous products forming a proportion of 80 to 85% and the protein a proportion of 10 to 15%. If the native starch in any form, whether it be in the whole cereal grain, as flour or as farinaceous product, is now treated with heat and water, the starch swells up and in doing so, can absorb more than 100% water without difficulty; in this process the crystalline structure is destroyed. The crystallization forces are disengaged. An amorphous starch structure is produced, the outer shape not undergoing substantial change apart from the increase in volume. No starch therefore emerges from the grain. Swelling starch is more digestible for humans than native starch. Swelling starch has, however, a special property in that it can easily and very rapidly absorb and release water again. Under nommal conditions the swelling starch can not be restored to the crystalline structure. Swellable starch is in principle described as swelling starch, i.e. independently of whether it has existed in the swollen state once already. Swelling starch immediately turns into swollen starch when the required amount of water is added.

Under the microscope native starch exhibits a double refraction in polarized light, which double refraction reveals itself through a star on every starch grain. Swelling starch no long exhibits double refraction. Since the double refraction is due to the crystalline structure, it is at least partially lost even with a fairly short heat treatment before the native starch has been completely converted into swelling starch. The condition for this is, however, the availability of sufficient water.

That state in which the swollen starch grains burst and lose their characteristic shape in doing so must be regarded as a glutination. The outlines of the starch grains can no longer be recognized. Their original shape has been lost. A farinaceous product of high quality necessitates a good skeletal structure of protein. Even in the dried state the starch is thus preserved by the protein skeletal structure. The starch in the boundary zone may partially pass over into the cooking water as a dispersion. A glutinated starch is produced even if damage is caused mehhanically, for example during compressing. If the intrinsic moisture is sufficient, the starch grains can further be made to burst by a heat shock with boiling water, steam or radiated heat. A good farinaceous product should if possible exhibit no damaged starch grains since the corresponding starch content is lost during cooking.

The new invention has brought about the realization for the first time that the process specified by the Swiss Pat. No. 383,747 causes the plastic-like surface of the farinaceous product because of several parameters. On the one hand a pure heating up, for example with infrared radiation without a controlled climate, results immediately in a complete condensing out of the moisture which rapidly accumulates at the surface of the farinaceous product as a film of water even though this should be avoided according to the Swiss patent.

In addition, the employment thus required of superheated steam at 101° to 170° C. is disadvantageously only practical in a pressurized system so that it was only possible to carry out experiments in a laboratory environment. In order to avoid more far reaching disadvantages associated with the superheated steam, the Swiss patent proposes a limitation of the duration of steam treatment to from 5 to 30 seconds. A practical implementation of this process described above with this duration of steam treatment being observed has not become known.

A principal matter of concern for the farinaceous product industry is a particular advantageous climatic conditioning from the output of the press to the finished product, a principal concern being that the surface of the farinaceous product after emergence from the mold is neither wet nor does it undergo any other change. This is also a reason for the finished farinaceous product retaining the rough or matt surface produced by the press. The excess superficial water which is inevitably produced by the process of the Swiss Pat. No. 383,747 results in a shock-like cooking with an excess of water as a result of the very intensive heat of the superheated steam, which in the end produces the disadvantageoss permanent alteration of the surface.

The process according to the invention eliminates the abovementioned disadvantages of the known process, in particular in relation to four aspects which ensure the maintenance of the desirable surface structure. In detail these are:

In a first climatic zone the product is at least slightly dried and heated to 80° to 100° C. In this process the water loss may amount to a few percent, in particular, for instance, 2 to 5% or even 2 to 8%. The first range is, as a rule, considered preferable. The steaming measure is not carried out with superheated steam but with freshly expanded superheated steam, consequently with a steam having a temperature of about 100° C. Freshly expanded superheated steam, however, contains the total enthalpy of evaporation or enthalpy of condensation which is about 539 kcal/kg of the steam. Consequently the result is the formation of superfine droplets of condensate, roughly in the order of size of 1 micrometer, only in the microscopic size range of the farinaceous product surface and a correspondingly intensive heat transfer without a continuous film of water being produced by condensation. The application of the superheated steam can therefore take place in a shorter or longer period of time according to requirements. The freshly expanded superheated steam is constantly renewed or supplied in further amounts so that no consistent film of water is produced on the surface of the farinaceous product because of the excess of heat supplied. At the same time it has proved to be quite particularly important that the superheated steam moves around the farinaceous product on all sides so that the nature of the entire surface of each portion of the farinaceous product is, as far as possible, uniformly modified. A conversion of the native starch into a swelling starch on only one side would, for many product shapes, result in correspondingly different drying behavior and finally in mechanical stresses and splits in the product itself. In this manner a process similar to cooking is established, in which, however, because of the absence of the formation of a continuous film of water on the farinaceous product or of an excess of water on the surface of the latter, the starch does not swell up in the usual manner. Nevertheless, depending on the length of the reaction time of the superheated steam, a correspondingly thick boundary layer of native starch can be converted into a swelling starch without the external structural appearance of the surface being affected.

The starting material of the process according to the invention is the farinaceous product leaving a molding head and having a temperature, generally, of about 40° to 50° C., in particular of about 40° to 45° C., which product, if necessary superficially treated with ventilating air, is laid mechanically on a conveyor device. In the case of the long products the latter is a rod suspension apparatus. Long products are cut directly on reaching the desired limb length (if a U shape is formed). In this case the dough strands are cut in a manner such that a matching to the dimensioning of the subsequent units in the heating and drying apparatus is carried out.

It is an absolute requirement of the process according to the invention that the shaped dough material leaving the molding head and situated on the conveyor device is subjected to heating to a temperature of more than 80° C. and at most 100° C. The period of time this occupies is expediently less than about 60 minutes, preferably less than 30 minutes and, in particular about one to 15 minutes.

For heating of short duration the term rapid heating could also be used. Air which is not completely saturated with moisture is selected as the heating medium. In this connection a humidity of about 60 to 85% is preferred. The range from 65 to 75% is considered to be particularly preferred.

If the said minimum temperature of 80° C. is set, the procedure adopted is advantageously such that in the first climatic zone various climatic stages exist which represent temperature jumps. The optimum number of climatic stages or temperature jumps depends on the minimum temperature aimed at in a particular case. Two climatic stages are at least provided. At least three climatic stages are generally considered advantageous. As a rule the temperature jumps should be about 4°0 to 12° C. A particularly advantageous procedure to adopt in this connection is for the wet temperature (dew point) of a subsequent climatic stage of higher temperature to be below the (dry) temperature of the preceding climatic stage in said first climatic zone. The heating medium is therefore preferably admitted to the following climatic stage with a temperature which is not raised beyond the psychrometric temperature difference t. As a result the undesirable condensation of steam occurring on the wall of the first climatic zone is prevented which could otherwise result in drops falling onto the farinaceous products.

The main drying takes place preferably in drying air having a specific moisture absorption capacity, in particular a relative humidity of about 65 to 80%. The duration of treatment in the main drying zone is generally about 30 minutes or more, thus, for example, about 30 to 120 minutes.

At the present time it may be regarded as a fact that the parameters influencing the color of the farinaceous product depend on the one hand on the types of wheat (soft, hard or durum wheats) and, on the other hand, also on the corresponding degrees of fineness of the semolinas and flours. There are added factors in the manufacture of the farinaceous products such as mixing of semolina/flour with water, the hydration phase with the corresponding residence time or mixing time etc. It is particularly in this phase that undesirable losses and changes in color may occur which are all, however, of enzymatic origin. As drying temperatures increase, the enzymatic reactions are stopped off above 60° C. In the range of lower product moisture such as about 10 to 14% by weight, they are replaced by the nonenzymatic browning reactions which depend, on the one hnnd, on the level of temperature and, on the other hand, on the length of the heating reaction time. High temperature drying processes with drying times of up to 10 hours as upper standard values have therefore been stipulated which should be between 68° and 80° C. depending on the raw material and ingredients such as egg. An egg-yellow color of the farinaceous product is rated as popular with the consumer and must therefore be aimed at by the manufacturer.

It is precisely through taking account of the unbeneficial effects of the hitherto known drying processes in the range from about 80° C. and up to 10 hours that the present invention leads to new knowledge. As a result of the preferably rapid heating in the first climatic zone and as a result of the treatment in the steaming zone which follows immediately, a heat-induced inhibition of oxidase is effected which prevents a further unnecessary pigment degradation. Added to this is the fact that it is also in the spirit of the invention to apply said high temperature stage in the region of fairly high product moisture since in this case the Maillard reaction still does not start to have an effect. In contrast to this, as a result of the absence of the brown or red tinting at this point in time, the farinaceous products treated according to the invention emerge more with an egg-yellow hue than the farinaceous products hitherto dried in the traditional manner. The invention therefore yields particular advantages in relation to the shade of color. The advantageous rapid heating of the farinaceous product in the first climatic zone to near about 100° C., in particular to about 95° to 100° C. must therefore be rated as particularly beneficial since the formation of a continuous film of water on the farinaceous product originating from condensation phenomena does not come about because of the very small or non-existent difference in temperature between the heating zone or the heated farinaceous product and the steaming zone.

The heat of the superheated steam promotes the actual heating up of the farinaceous product only to a small extent and promotes the biochemical conversion of the native starch into a special swelling starch to a greater extent. In addition, the negative effects of the browning reactions are avoided or circumvented by the application of extremely high temperature and steam treatment in fairly high product moisture ranges. This leads to qualitatively better products, even in the sense of preserving the biological value.

In farinaceous products, in addition to the proteins, reducing carbohydrates are also present, which initiates the Maillard reaction already mentioned on heating up. This has fairly strong effects on nutritional physiology, on the one hand, because of the possible reduction in the biological value of the proteins, and on the other hand, because of the formation of characteristic odiferous substances and flavorings, and this may be desirable, for example, in baking and frying. The Maillard reaction proceeds correspondingly more slowly at lower temperatures and may therefore even occur during the storage and frequently limits the shelf life of foodstuffs. The Maillard reaction is based on extremely complex mechanisms in which a large number of different reaction products are produced.

Because of the Maillard reaction lysine losses are known in the processes hitherto known for the manufacture or drying of farinaceous products with fairly long treatment time. Thus, with a drying temperature of 80° C., losses in nutritional value of up to 47% were found.

Compared with the known proposals, the invention offers the surprising advantage that it prevents the decrease of essential amino acids such as lysine. The products obtained according to the invention exhibit better digestibility with increased nutritional value. The better digestibility is achieved within the framework of the process according to the invention through the denaturing of the proteins as a result of the injection of superheated steam or of superheated steam treatment in a manner similar to pasteurization or sterilization. The treatment in the steaming zone, in particular, is responsible for this.

Furthermore, it is a finding of the invention that with the application of pasteurization or sterilization in the steaming zone a beneficial effect is achieved in relation to bacterial and enzymatic aspects. As a result of the treatment in the steam zonemost of the microorganisms are killed off and at the same time most of the enzymes are inactivated.

Furthermore, the invention shows that the conversion of the starch in the region of the surface of the portion of material or in the boundary layers permits a more rapid drying out or drying off of the farinaceous products as a result of the water binding or retaining capacity of the starch, and this is particularly advantageous in relation to shortening the drying time.

A type of multilayer structure therefore forms, at least the starch grains of the outermost boundary zone being converted into a swelling starch. At the same time, however, it is characteristic that the so-called al dente core remains in the native condition in the core.

Within the scope of the invention it is, moreover, preferable that the farinaceous products are treated for about one to 30 miutes, with very particular preference for about 3 to 15 minutes, with (freshly expanded) superheated steam and, depending on the wall thickness or on the thickness of the product, heated to 80° to 100° C., in the case of large wall thickness (2.0 mm and over) in less than about 30 minutes, in the case of medium wall thickness (1.00–2 mm) in less than about 20 minutes and in the case of small wall thickness (0.5–1.0 mm) in about 5 to 10 minutes. The said wall thicknesses are technical data which are familiar to those skilled in the art and relate to hollow farinaceous products, in particular spaghetti.

The invention makes it possible for the first time to match the essential parameters, i.e. time and temperature, in particular, however, also temperature and humidity differences, to the product desired in a particular case and also to control the biochemical processes, which were hitherto difficult to influence, in the desired sense through the drying process as such.

In the case of pasta secco products heating to 80° to 100° C. is preferably carried out in less than 20 minutes, while treatment with freshly expanded superheated steam is carried out for 5 to 15 minutes and drying is subsequently carried out at a temperature of 75° to 95° C. to less than 14% by weight, the entire treatment time from emergence from the mold to the final drying being less than an hour.

Normal pasta all'novo products are preferably heated from the mold in less than about 30 minutes to the temperature of 80° to 100° C. and treated for about 3 to 15 minutes with the freshly expanded superheated steam and subsequently dried at a temperature of about 70° to 90° C. to less than about 14% by weight, in particular 11 to 13% by weight, the total treatment time from emergence from the molding head to the final drying biing about one to four hours.

The shortest treatment times are to be applied to inexpensive farinaceous products, the rather long treatment times to thick-walled products and to farinaceous products of higher quality. In accordance with the experience with prolonged cooking in pressure cookers, the process according to the invention results in a corresponding reduction in quality with a longer duration of treatment than the specified values. Farinaceous products with a high protein content should therefore preferably be heated to a temperature of 80° to 100° C. in less than about 30 minutes and treated with the said superheated steam for about 3 to 15 minutes and subsequently dried at a temperature of less than about 80° C. to below about 14% by weight, in particular about 11 to 13% by weight, the total treatment time being about 3 to 6 hours.

As a result the invention relates to the manufacture of classical farinaceous products which are characterized in the dried storable state in that they contain the starch in the native state in the core of the farinaceous product and in the boundary layer or in the form of swelling starch in the region of the entire surface of the portion of material, the surface having an accustomed, matt (but in particular, not glassy and shiny) color corresponding to the product ingredients.

The invention relates further to an apparatus for manufacturing or for drying farinaceous products comprising a press, a conveyor device for the farinaceous product and also a drier which is suitable in particular for carrying out the process according to the invention. The characteristic of said device resides in a first drier with means for controlled climatic conditioning and for rapidly heating the freshly molded farinaceous product with at least slight initial drying, a steam cooker with a feed-through conveying means and also steam preparation chambers, which are preferably disposed below the feed-through conveying means, and means for separating the steaming zone from the preceding or subsequent climatic zone and also in a second drier with controlled climatic conditioning.

All the previous experience has confirmed that the farinaceous product should not exceed a temperature of about 45° C. in the press. If a farinaceous product with a moisture content of over 30% is then heated too rapidly to a temperature of almost 100° C., this inevitably results in an exudation of the water. The invention therefore proposes carrying out the heating with at least a slight initial drying of at most a few percent in a controlled climate. So that the product is uniformly treated, it is preferable to dispose the steam preparation chambers below the feed-through conveying means. As a result of this the possibility is provided of creating various steaming zones. At the same time, however, the intention is to prevent the steaming zones immediately mingling. According to the invention the steam must flow through the feed-through conveying means and the product from the lower steam preparation chambers upwards.

It is intended to explann the invention below on the basis of the figures in still further detail. Here.

Figures 1, 1B:
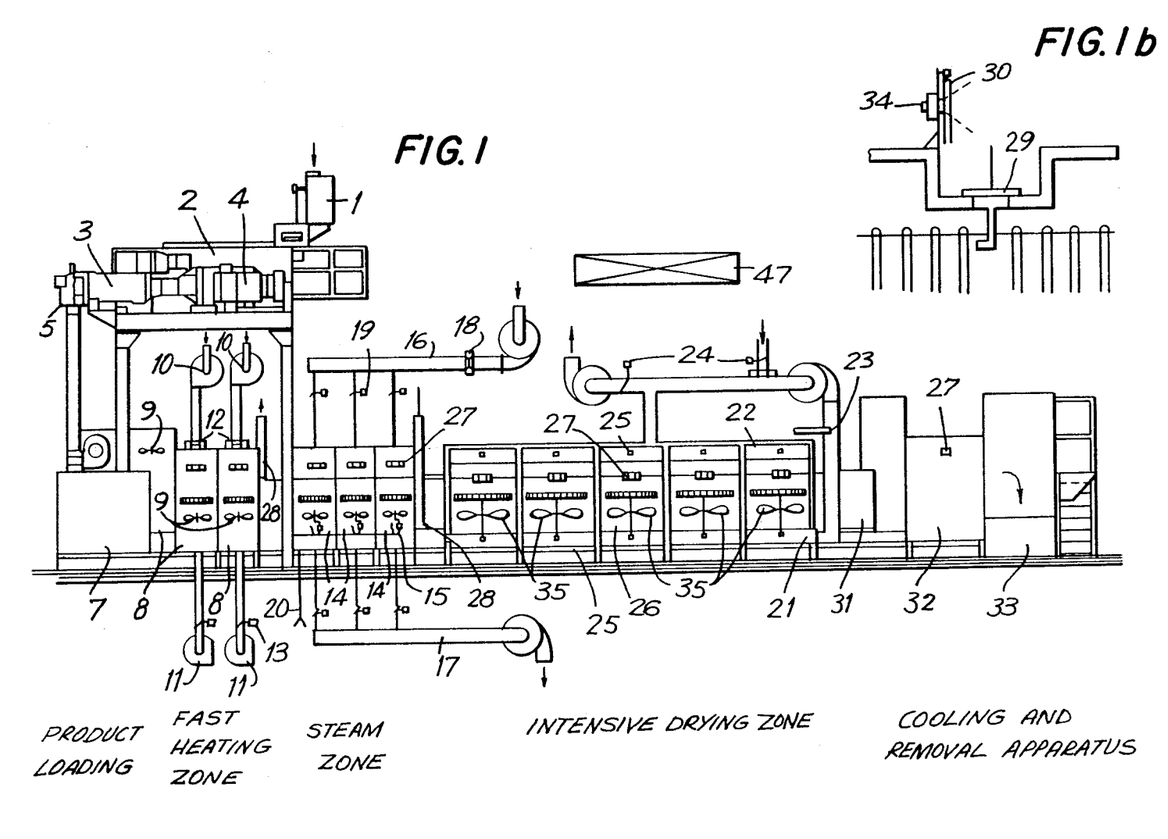
FIG. 1 shows diagrammatically a longitudinal view of the entire treatment zone.
FIG. 1b shows an automatic rod removal.
Figure 2:
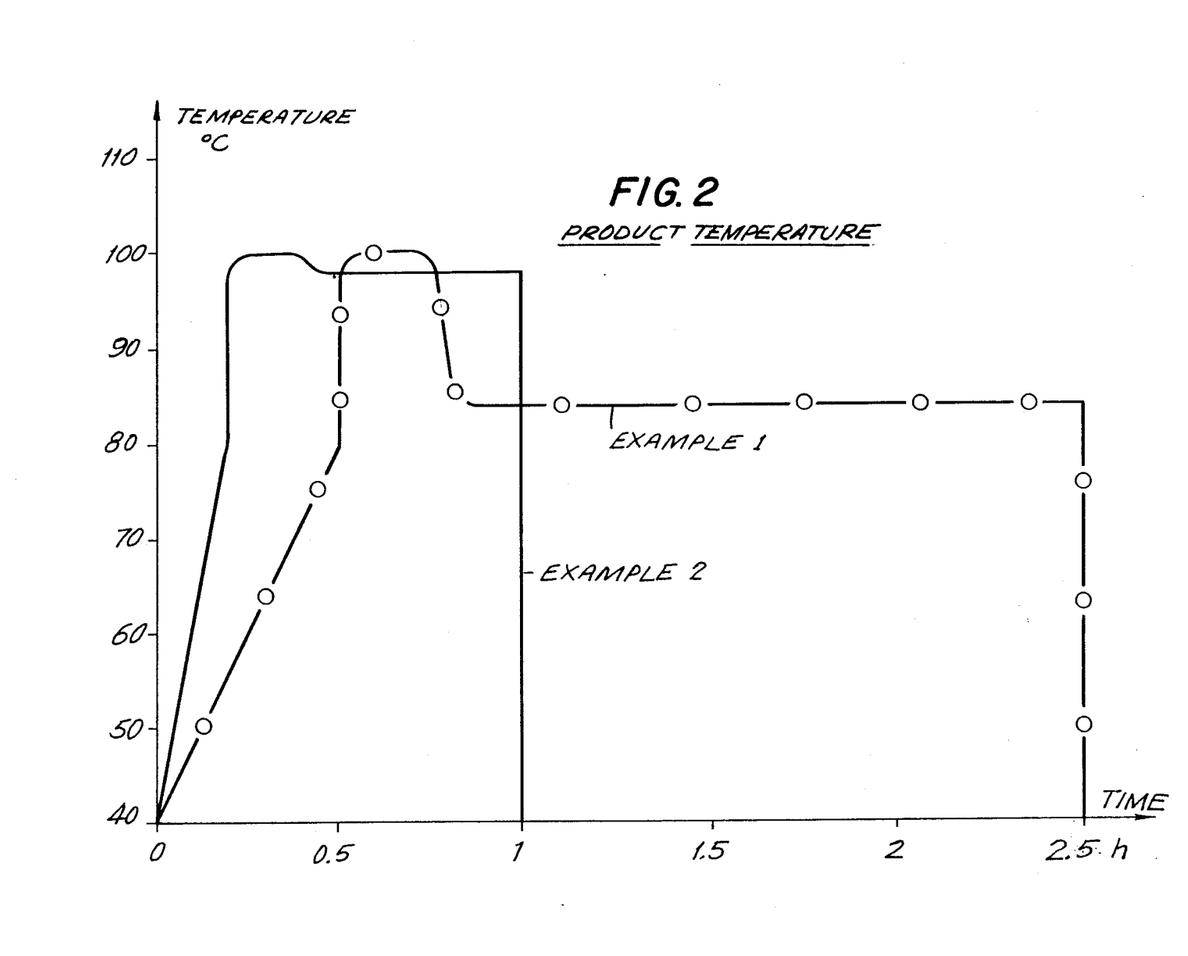
FIG. 2 shows the functional relationship between treatment time and treatment temperature in the process according to the Examples 1 and 2.
Figure 3:
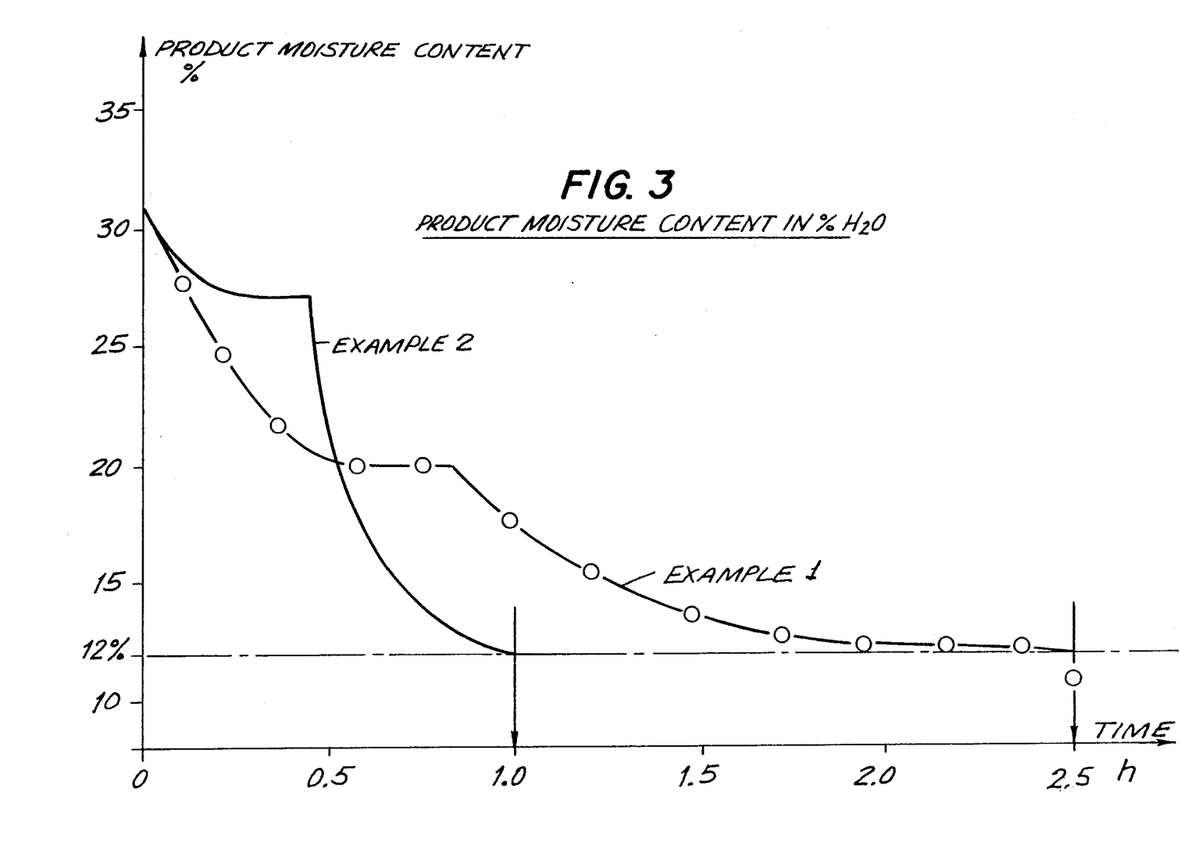
FIG. 3 shows the functional relationship between product moistness and treatment temperature in the Examples 1 and 2.

In FIG. 1 all the basic process steps are represented diagrammatically. The raw materials—semolina and flour derived from durum, hard or soft wheat, together with liquid components such as water or egg—are dispensed in a controlled manner into a mixing trough 2 via a flow control device 1 and homogeneously mixed in the trough. Via a feed worm the homogeneously mixed, crumbly dough mass is fed into the pressing cylinder of a pressing worm 3 which is driven by means of a variable speed motor. The processes in the pressing worm may be outlined as follows: removal of the air by means of vacuum, kneading, compacting of the dough and formation of the protein structure (protein/starch), shaping of the farinaceous products by means of die 5 to form the appropriate market-oriented, moist farinaceous products and cutting of the latter.

Depending on format and product (short or long products), the freshly molded farinaceous products are quite briefly treated by means of a blowing device 6 so that the superficial stickiness disappears. The moisture loss in this process is very small, at any rate below about 1%. There follows a product loading device 7. Depending on the product this is a device for long products, constructed as a rod suspension device, for short products as a distributor on a belt or vibration feeder, and for nidi and whirls as a whirl or nidi overlay apparatus on frames. Immediately after the product layering device 7, which may even be an integrated component of the rapid heating zone 8, the rapid heating of the product takes place in two or more stages to a temperature of at least 80° C., in particular above 85° C. in less than 20 minutes. In this process the climate is controlled by the air-circulating fans 9 and also by the fresh air channels 10 and the exhaust air channels 11 is controlled in a manner such that the mutual connection channels and connection channels through the individual stages are computed element by element in the sense of a turbo system via throttle 12 and flaps 13 by means of a central computer 47.

The rapid heating zone 8 is followed by a steaming zone 14 with at least one or more elements 14 and which the product is steamed for about 1 to 20 minutes at a temperature of about 100° C. The steam ss supplied via one or more steam distributors 15 which are fed with fresh steam 20 via a pipeline. As in the case of the heating zone 8 the steaming zone is also regulated and controlled by its own turbo system consisting of the fresh air channel 16 or steam and exhaust air channels 17, or steam channels 18 and flaps 19 which are monitored by the central computer 47 and regulated section by section. In order to dry the farinaceous products after the steaming zone to the desired final moisture content of about 10 to 14% by weight, in particular 11 to 13% by weight, the steaming zone is followed immediately by an intensive drying zone 26 comprising one or more elements. Drying is carried out with hot air or with a hot medium temperature of over about 80° C., preferably over 90° C. or with superheated steam at 100° to 200° C., preferably 120° to 140° C.

Each intensive drying zone 26 is equipped with a channel for fresh air or fresh steam 21, a channel for exhaust air or exhaust steam 22 and a humidifying device 23. This is a turbo system. The entire turbo system is again monitored by the central computer and regulated via throttles and flaps 24 section by section in the elements via slider 25. Each element has its own circulating system 34 for the treatment medium, i.e. air or steam or a mixture of the two.

Rapid heating zone, steaming zone and also intensive drying zone are equipped in each element of the computer with controlled climate monitoring probes 27 for temperature and humidity. Since the implementation of the process according to the invention takes place in fairly high to extremely high temperatures combined with high air humidity values, the control of the product from outside and, in particular, manually by the staff is not advisable or possible (the risk of burns). For this reason a product removal 28 after the rapid heating zone and after the steaming zone is carried out in an automatic and controlled manner.

FIG. 1b shows an example of an automatic rod removal 29 in which a rod is picked up with a hook, removed from the zone and placed on a suspension device 30. It is no longer possible to return the rod since it has to remain outside the system for some time for the purpose of automatically recording color, moisture content and optical assessment and also for taking samples for laboratory analysis. The continuous operation is not disturbed by this. At the end of the drying phase the products, on reaching the product moisture content of about 12% by weight are fed via a transfer channel 31 to a cooling zone 32 where the product is monitored by means of a probe 27, regulated, cooled and stabilized. The farinaceous products are fed to the appropriate store counters or the packing devices via a removal device 33.

It has emerged that for all formats a very precise regulation of the climates in all the process elements is expedient. Advantageously each element has its own circulation system, the treatment medium being fed from the top downward or from the bottom upwards. It is particularly advantageous if the entire course of the process takes place in a tunnel resembling a baking oven or in a single continuous deck with several zones. Uncontrollable longitudinal movements of the treatment medium can thereby be avoided. All the probeems of climate regulation or control with drying stages arranged above each other cease to exist. It is particularly important that the three climates of the main zones (heating, steaming and drying) can then be independently regulated or independently conditioned in a controlled manner.

Figure 4:
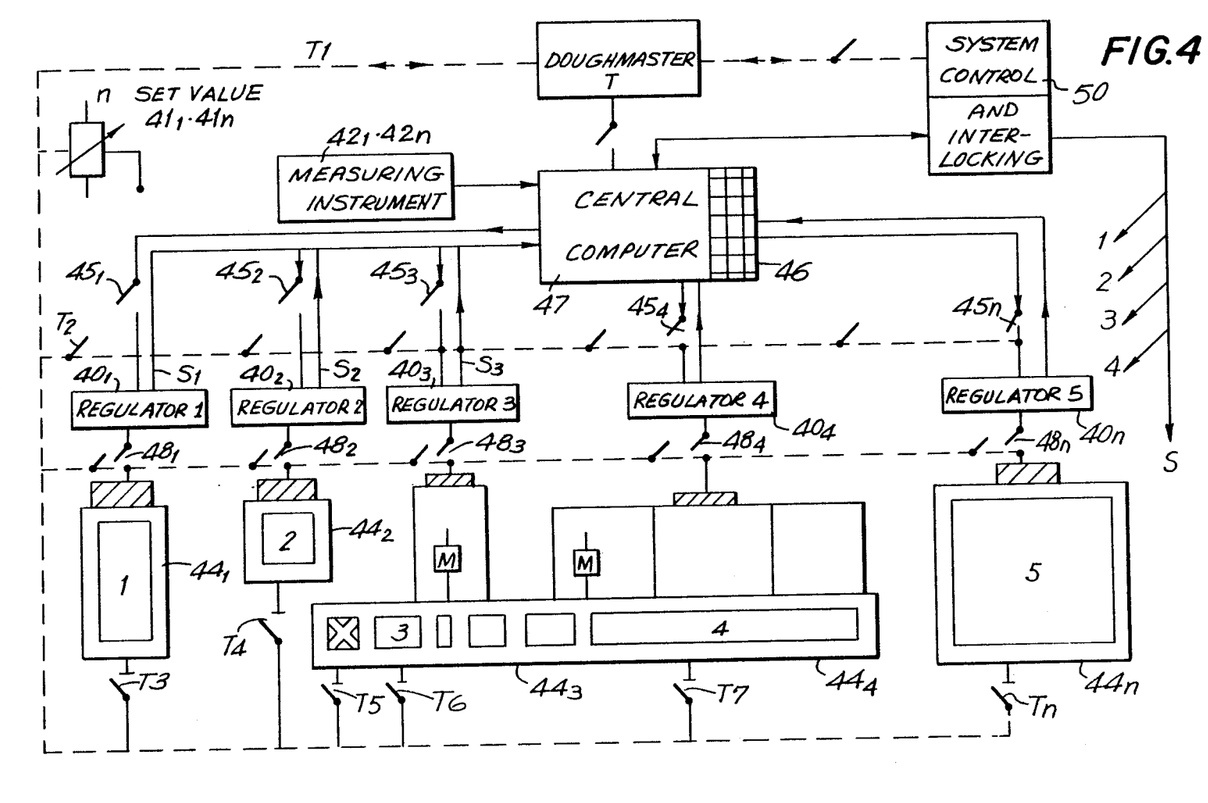
FIG. 4 shows the regulating or controlling unit as in FIG. 1.

In FIG. 4 the individual process steps are brought out by means of suitable blocks, process zone 1 representing the preparation of raw material (controlled raw material mixing) consisting of semolina, water and other ingredients and dispensing thereof. The dough preparation of process zone 2 chiefly comprises the mixing, pressing and shaping. The freshly pressed farinaceous product is automatically suspended on rods and introduced into process zone 3, which represents the heating zone. The process zone 4 comprises the drying proper. In process zone 5 the essentially finished dried farinaceous product is stabilized, transported vertically and automatically packed in household packages or other packages.

A regulator 40$_1$–40n is systematically represented for each process zone. In reality each individual zone, if appropriate, has a number of individual regulators which are brought together in an auxiliary computer and, if appropriate are also coupled to the system control and interlock 50, or at least can be connected to it for the information flow.

The central computer 47 is constantly in direct contact with the set value store 46 for storing individual data or programs and removing the same. Measuring instruments $42_1$–$42_n$ (product measurement and monitoring devices (M) for product temperature, moisture content, color and product starch and also protein and ash and the like) are likewise in contact with the central computer 47. A set-value device $41_1$–$41_n$ likewise connected to the measuring instruments (M) may, if necessary, be used for complete or partial manual operation.

It is furthermore very important that the signal lines $S_1$–$S_n$, which are connected from the respective process zones to the central computer 47, are not open-circuit at any instant in time. On the other hand, the control lines from the central computer to the respective regulators $40_1$–$40_n$ or process zones $44_1$–$44_n$ have switches $45_1$–$45_n$ or $48_1$–$48_n$ for switching purposes. A central feature of the system is the interplay of the individual system elements with the electronic or computer means on the one hand and with the doughmaster who, with his experience and knowledge of the product and also system specialities, can counteract the deviations which occrr daily.

To control the operation the following procedure may be adopted: on starting up for the first time, all the system elements are put into operation in accordance with the interlock system. Subsequently the individual regulating circuits (for regulating the quantity of air, humidity and temperature etc) are optimized by hand. The corresponding data are fed into the central comuuter 47 or the set-value store 46 to establish the set-value systems (e.g. punch cards).

The production is started by activating the appropriate product supply or dispensing elements. The control and regulating circuits associated with the product parameters are roughly set in accordance with the empirical values. The corresponding values can in turn be transmitted to the set-value store 46 or the central computer 47. The complete starting-up production is controlled by means of the appropriate starting-up program to be entered for the purpose on the basis of these data. After completion of the starting-up phase, which may for example last 1 to 4 hours, the doughmaster starts to check the entire manufacturing process. He then optimizes the product, air or climatic parameters in the process sections which appear of interest to him or in the necessary process sections. For this purpose he open circuits the appropriate control line of the central computer 47, for example to the process zone 3 by open circuiting the switch contact 45_3. The regulator 3 continue to operate with the set-value entered before the control line was open circuited. The doughmaster then enters an improved set-value by an appropriate input at the regulator 3 or at one of the regulators in the process zone 3. The best set values found are in turn fed into the central computer or the set-value store. The switch 45_3 can then be connected again and the appropriate group of regulators operated with the newly determined set values. Optimizing operating on the part of the doughmaster can be undertaken at any time by appropriately operating the switches $T_1-T_n$ or $45_1-45_n$. A decisive feature of this procedure is that at the same time as the set-value systems for the process parameters are fixed, the associated systems of input parameters such as power (kg/h), type and mixing of the raw material (durum, hard and/or soft wheat), water added and various ingredients (egg salt etc.)) and also the product quality parameters (moisture content, color, firmness etc.) are allocated.

Once all the parameters relating to input and output of the farinaceous product and also all the parameters relating to the conduct of the process have been determined and recorded in the set-value store—with the same product quality now being reproduced—the set values last determined to be optimum are used as the basis for, or called up for, the new production. This is also true of the starting-up, production and shutting-down diagrams. The doughmaster can thus run the farinaceous product line at a substantially reliable level, the computer means, the regulators and also the measuring instruments being valuable aids. At any time he can control manually at any point by disconnecting the electronic automatic means at special places, or else he can leave the system to run automatically on its own for rather long periods of time. In special situations or emergencies the doughmaster can himself run the entire system in semi automatic operation without the process zones being linked via the computer means. In this connection it is essential that he can have recourse to the system control and interlock system.

Figure 5:
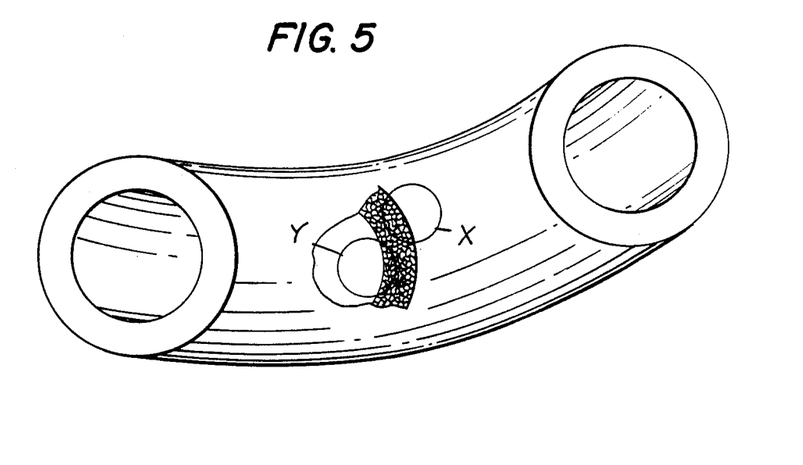
FIG. 5 shows a piece of short cut macaroni treated according to the invention.
Figure 6:
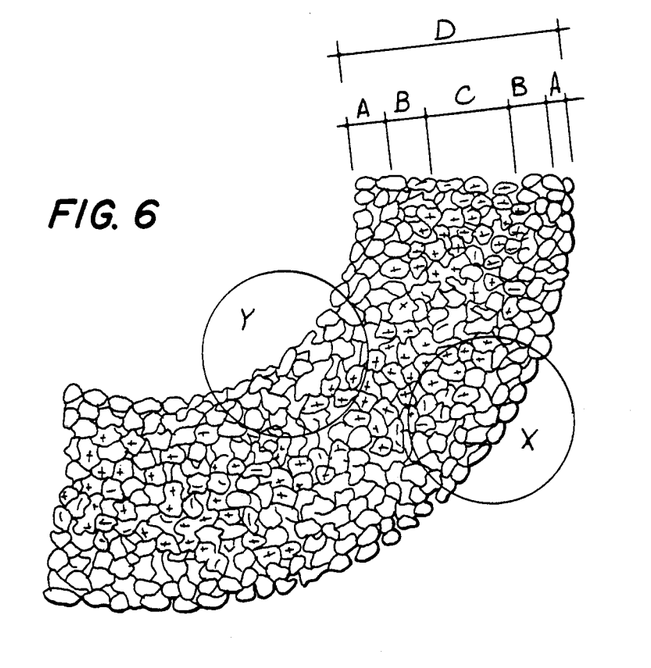
FIG. 6 shows a detail of the piece of short cut macaroni as in FIG. 5 on an enlarge scale.

In what follows reference will be made to FIG. 5 which shows a piece of short-cut macaroni on an enlarged scale and also to FIG. 6 in which a section of the piece of short-cut macaroni is shown on a still larger scale. The region "Y" is on the inside of the farinaceous product and the region "X" on the outside. FIG. 6 is a schematic representation based on a corresponding microscope photograph. Only the starch grains are shown, but not the skeletal framework of protein.

The farinaceous products obtained according to the invention have a layer (complete) of swelling starch (white grains) at the outer edge (A). The core (C) of the farinaceous product, on the other hand, consists of native starch grains, i.e. grains with a cross. Between the core (C) and the edge (A) there is an intermediate layer (B) which has not yet been completel converted into swelling starch but still has a few grains with double refraction. It is only in the core itself that the starch of the farinaceous product has remained in the unaltered state. In relation to the cooking characteristics the new farinaceous product is identical to the classical farinaceous product since a good skeletal structure of protein is retained, virtually no damaged starch grains are present and apart from a relatively thin boundary layer, the entire inner part has to be fully cooked in normal time. The farinaceous product obtained according to the invention differs from the previous farinaceous products in relation to the starch insofar as the latter has aleady been subjected to a similar cooking process, the starch grains, however, remaining intact in relation to their external shape. The farinaceous product cooked wtth excess water generally exhibits only burst starch grains at least at the outer surface. The same cooking time of the farinaceous products obtained according to the invention results from the fact that the cooking time per se depends to a very important extent on the wall thickness of the farinaceous product. In this case two processes are decisive, namely the penetration of the water and also the conversion of the crystalline structure into an amorphous state on the one hand, and the swelling and complete cooking of the starch on the other. Both processes require time. Since the outer boundary layer is now already a swelling starch, this will absorb the water correspondingly rapidly without the native starch being favored in the chronological order of events. Almost the same period of time as in the case of the earlier tranditional farinaceous product is required before the water penetrates into the core and has an effect.

In addition to this, both in the prior art and also in the new invention various accompanying processes are almost unresearched. Until now it has not been possible to describe the particular course of events specifically on the basis of phenomena which can be observed externally. Of interest in this connection is, for example, the water absorption. Freshly pressed farinaceous products were fed with a water content of about 30% directly into freshly expanded steam. Some of them were removed after 5 minutes.

It was possible to determine a water content of 31.5%. Further samples were removed from the steam climate after 10, 15 and 20 minutes and a water content of 32.0, 31.9 and 32.4% respectively was found by the heat barrier method. It follows from this that in the present case a water absorption of 1.5% can be found only in the first 5 minutes which is due to a relatively large temperature difference on introducing into the steam. The farinaceous product then no longer absorbs any additional water in the course of 15 minutes. A portion of the same freshly pressed farinaceous product was not treated in steam but cooked for 5 minutes. After 5 minutes the water content of this farinaceous product was 62%. This demonstrated, however, that according to the invention no treatment of the farinaceous product in excess of water, and consequently no cooking, takes place. Despite this the structural change described earlier above is produced.

Figure 7:
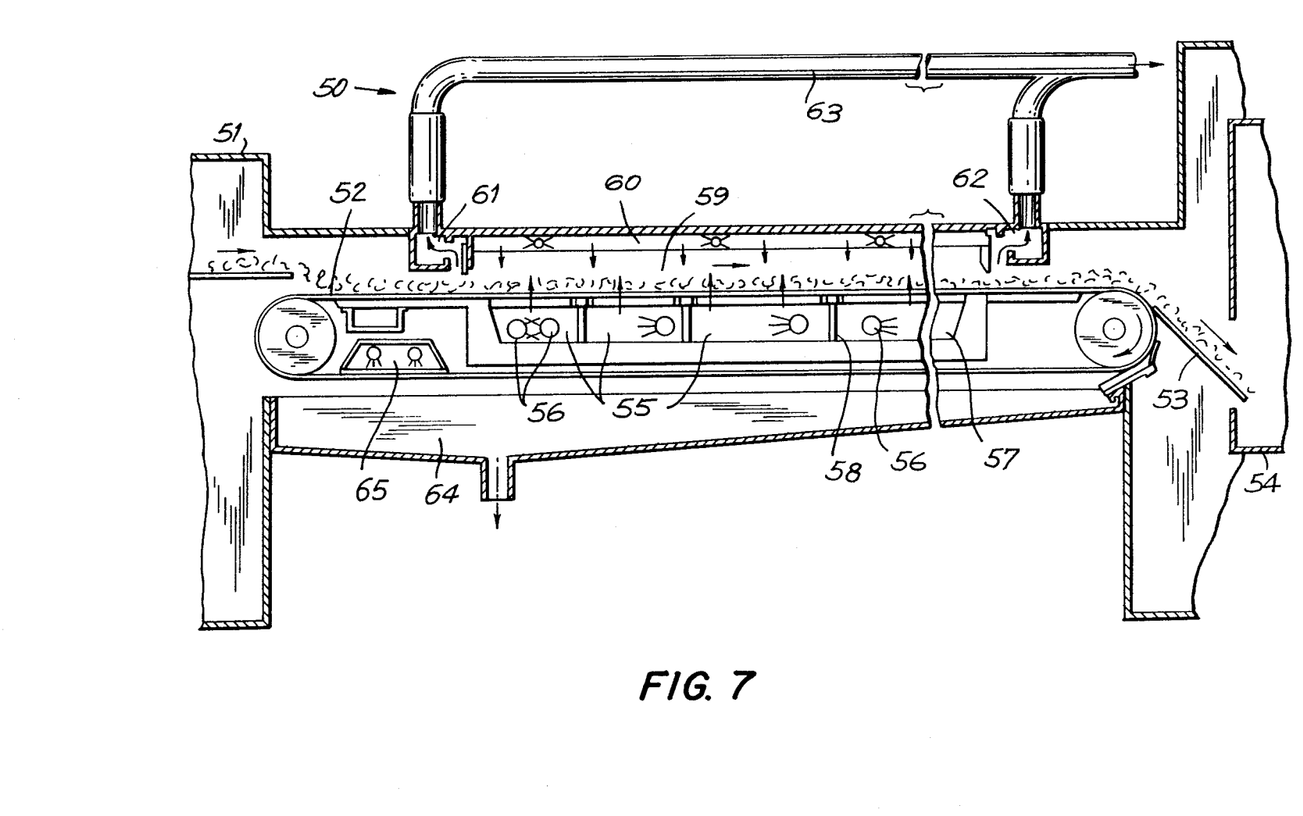
FIGS. 7 to 10 show various embodiments of the apparatus according to the invention.

FIG. 7 shows a steam cooker in the form of a belt cooker 50 for short-cut normal farinaceous products. The product is transferred from a first drier 51 directly to a cooking belt 52. At the end of the cooking belt 52 the product is transferred via a chute 53 to a second drier 54. Below the cooking belt 52 the belt cooker 50 has several steam preparation chambers 55. Each preparation chamber 55 has steam supply lines 56 with horizontal steam injection 57. Each of the steam preparation chambers 55 is separated by a partition 58 so that the steam of each steam preparation chamber 55 inevitably flows through the cooking belt 52 and the farinaceous product. Above the steam preparation chambers 55 there extends above the cooking belt 52 the steam cavity 59 which is bounded at the top by an additional steam preparation chamber 60. The steam cavity 59 and the upper steam preparation chamber 60 extend over the length of all the lower steam preparation chambers 55. At the front and rear end of the steam cavity 59 is located in each case a steam extractor 61 or 62 respectively, the steam leaving the steam cavity 59 being removed via a steam exhaust line 63. Below the cooking belt 52 there is collection tank 64 for the cleaning water of the belt cleaning system 65.

Figure 8:
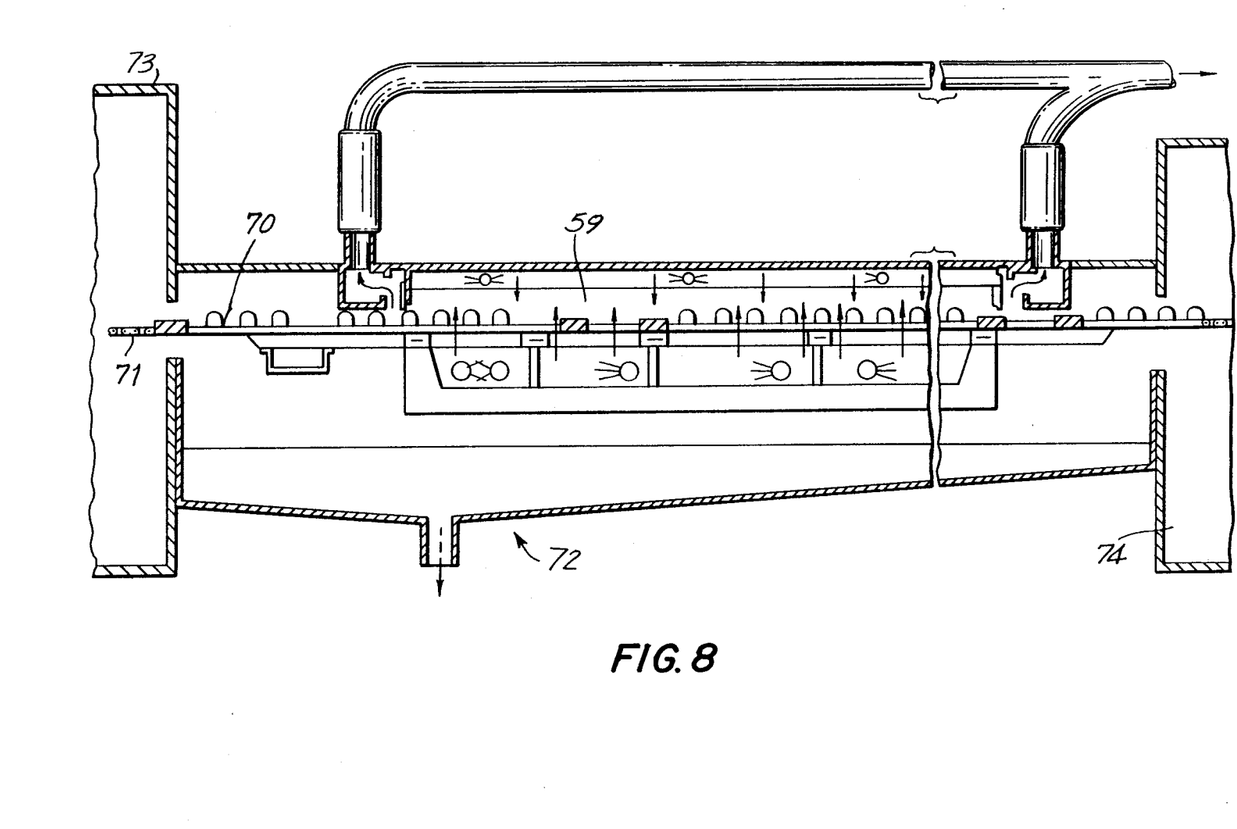

FIG. 8 exhibits in principle the same structure as FIG. 7. Here, in contrast to the latter, however, drying frames 70 are pulled through the steam cavity 59 on a chain 71. The solution shown in FIG. 8 is described as a tray or frame cooker 72. This referstto the trays or frames which are also used in the first drier 73 and also in the second drier 74. All the special products such as nidi, whirls and products in suitably constructed finished packages are treated on the trays 70.

Figure 9:
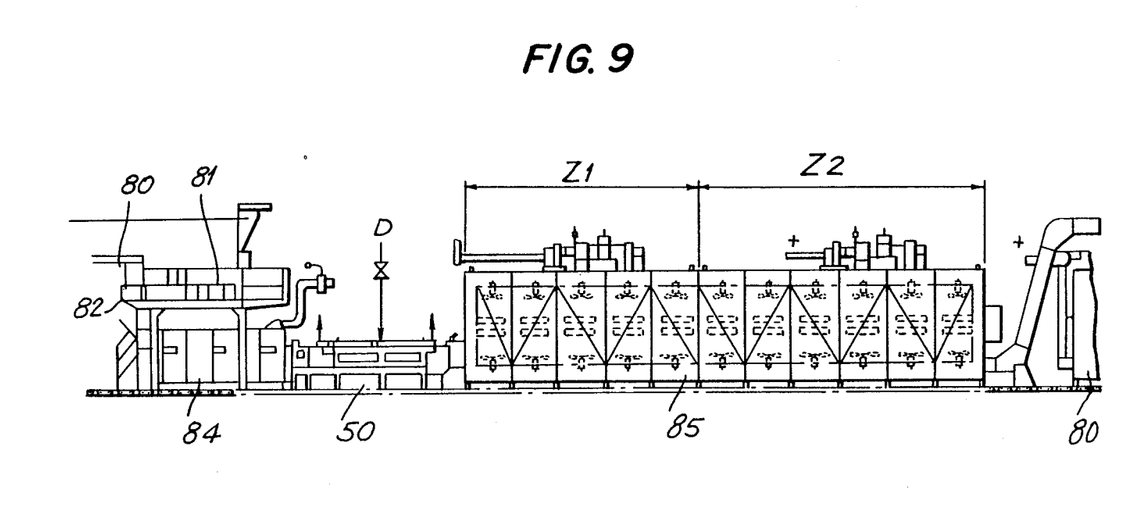

FIG. 9 shows a complete farinaceous product line for short-cut normal farinaceous products with a suitable steam belt as described in FIG. 7. The entire farinaceous product line in this case has the following elements: dough preparation 80, dough press 81, and mold 82 with mold ventilation 83 from which said freshly pressed farinaceous product is directly transferred to a drier 84 which in this case is constructed as a shaking or vibration drier. From the steam belt 50 the product is dried to the final moisture content in a drum drier 84 which is preferably split into two zones Z1 and Z2 and then passed to the product stacker 86.

Figure 10:
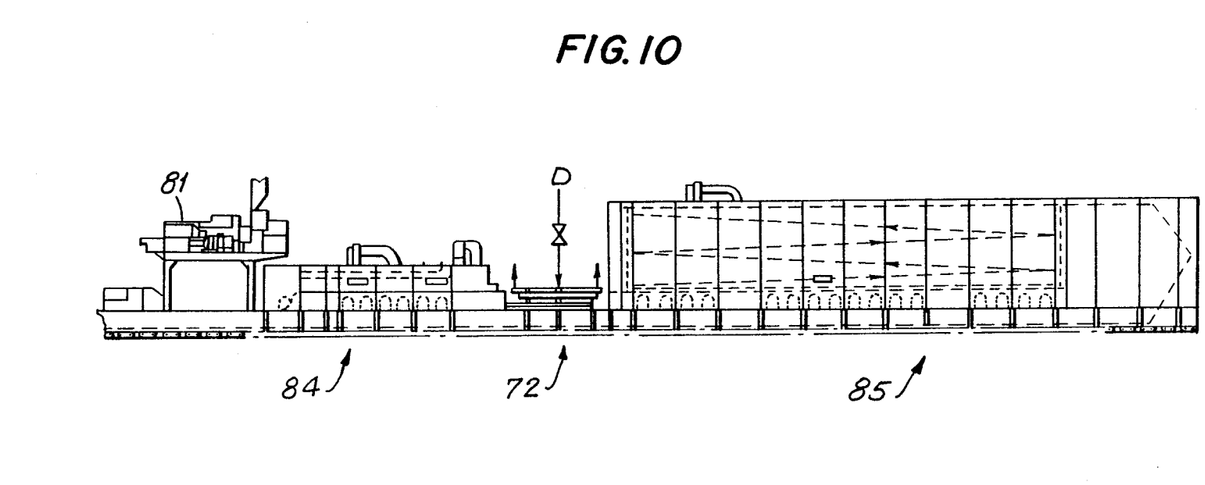

FIG. 10 shows a farinaceous product line for special products with a tray or frame cooker 72. In contrast to FIG. 9, the first drier 84 consists of a drier with frames or trays. The second drier is formed from a multideck drier 85. In this type the frames are taken through the entire system by means of the transport chain 71.

It is intended to explain the invention in more detail below on the basis of manufacturing examples.

EXAMPLE 1

The required process product are long products in the form of spaghetti with a diameter of 1.72 mm in the dry state. Quality: 4 egg.

100% hard wheat semolina was moistened with 200 g of solid frozen complete egg (4 egg) per kg of semolina and water to a water content of 31.0%, and mixed. The parameters of the extrusion device were adjusted as follows:

| | |
|---|---|
| Speed of worm | 28 rpm |
| Extrusion pressure | 100 bar |
| Temperature | 40° C. |
| Vacuum | 0.92 bar |

Molding head for the manufacture of spaghetti (wet) 1.9 mm (construction: Teflon)

The strands of dough leaving the molding head at 40° C. and having a diameter of 1.9 mm were brought to a temperature of 95° C. in the heating zone in the course of 25 minutes, the moisture content being reduced from 31% to 20% water.

The treatment in the steam cooker then took place for 15 minutes at 100° C. without drying and without moistening.

After the treatment in the steaming zone a drying took place in the course of 110 minutes at 84° C., the pieces of spaghetti being dried from 20% to 12% final moisture content.

The resultant farinaceous products yielded a slight increase in pigment content from 9.63 mg of—carotin/kg for products dried at normal temperature to 10.33 mg of—carotin/kg.

Neither a brown or a red coloration or the glassy and transparent appearance of plasticized products could be detected. The visual appearance of a traditional farinaceous product was retained in this treatment.

The product so obtained was cooked in boiling water for 12 minutes. Only very minmmal cooking losses were detected. The farinaceous product was neither glutinous nor sticky and had a very good biting firmness and an eating feel corresponding to the traditional farinaceous products.

EXAMPLE 2 (pasta secco)

Short products, i.e. short-cut macaroni having dimensions of 5×3 mm, were manufactured. The quality was characterized as "pasta secco" 100% durum middlings were moistened with water to an initial moisture content of 31% and mixed. The extrusion parameters corresponded to those of Example 1, with the exception that the worm speed was reduced to 20 rpm.

Immediately after leaving the molding head, the formed short products were brought to a temperature of 80° C. in 12 minutes. In this process a drying of the product from 31% to 27% product moisture content took place. Steaming was then carried out in the course of 12 minutes and followed by final drying in the course of 36 minutes at 98° C. to a final moisture content of 12% by weight. The pigment content rose from 9.3 mg of -carotin/kg for normally dried products to 10.01 mg of -carotin/kg. The sensory assessment was positive in all respects.

At the same time it was noted that tee visual impression, especially in relation to the color of the traditionally manufactured products, was superior.

EXAMPLE (Nidi)

Nidi product strands 2×0.8 mm left the molding head, were immediately shaped while moist to form a nidi (nest) and placed on frames. The diameter of the nidi was 50 mm and its height 40 mm.

After a heating phase of 10 minutes to a temperature of 95° C., the nidis, with a water content of 24%, were steamed for 3 minutes and then dried for 4 hours at 75° C. to a final moisture content of 12%.

Visually, it was possible to assess the nidis as very good. They had been kept in shape and the color was nicely egg-yellow. In this connection it was of primary importance that the individual strands came apart during preparation (cooking) and did not stick together. It was also possible for this requirement to be fulfilled surprisingly beneficially with the set parameters of the invention.

We claim:

1. In a process of manufacturing farinaceous product having a final moisture content of about 11 to 13% by weight, wherein the farinaceous product, which leaves a molding head in the form of a soft material which is moist and moldable is conveyed through differentially heated climatic zones to final drying and the farinaceous product is cooled or dimensionally stabilized after completion of the drying process, the improvement comprising heating farinaceous product upon leaving a molding head in a climatic zone to a temperature of 80° to 100° C. with initial drying sufficient only to remove superficial stickiness of the product, then converting the native starch of the boundary layer of the farinaceous product into swelling starch by employing freshly expanded and super heated steam by allowing the steam to flow around the product for about 30 seconds to 20 minutes so as to avoid a film of water developing on the surface of the product, and then drying the farinaceous product in a controlled drying climate to said final moisture content.

2. Process as claimed in claim 1, wherein the farinaceous product is treated for 1 to 15 minutes with superheated steam.

3. Process as claimed in claim 1, including the step of heating farinaceous product of large wall thickness in less than 30 minutes, those of medium wall thickness in less than 20 minutes and those of thin wall thickness in about 5 to 10 minutes to 80° to 100° C.

4. Process as claimed in claim 1, wherein the farinaceous product is heated in a first climatic zone through one or more temperature jumps in the climatic stages subdividing first climatic zone, the dew point of a subsequent climatic stage within this first climatic zone being below the temperature of the preceding climatic stage.

5. Process as claimed in claim 1, wherein water-based farinaceous product is heated in less than about 20 minutes and treated in the course of about 5 to 15 minutes with superheated steam.

6. Process as claimed in claim 5, wherein drying is carried out at a temperature of about 75° to 100° C. while adhering to a total treatment time of less than about one hour, as determined from the instant in time of the emergence from the molding head to the final drying.

7. Process as claimed in claim 1, where egg-based farinaceous product is heated in less than about 30 minutes from the emergence from the molding head and dried at a temperature of about 70° to 95° C. while adhering to a total treatment time of about two to three hours, as determined from the emergence from the molding head to the final drying.

8. Process as claimed in claim 1, wherein farinaceous product of high protein content is heated, treated with the superheated steam and then dried at a temperature of less than about 80° C. to a moisture content of less than about 13% by weight while adhering to a total treatment time of about three to five hours, as determined from the emergence from the molding head to the final drying.

9. Farinaceous products resulting from a process as claimed in claim 1, wherein, additionally, the starch of the farinaceous product is still in the native state in the core of the farinaceous product after drying and in the boundary layer or in the region of the entire surface of the portion of material is present in the form of swelling starch and wherein the surface of the dried farinaceous product has a matt surface and is not glassy and shiny.

* * * * *